(12) United States Patent
Daye et al.

(10) Patent No.: US 9,338,291 B2
(45) Date of Patent: May 10, 2016

(54) USING AN ISDN MESSAGE HEADER TO SUPPORT TIME ZONE IDENTIFICATION

(71) Applicant: International Business Machines Corporation, Armonk, NY (US)

(72) Inventors: Sheri G. Daye, Boca Raton, FL (US); Peeyush Jaiswal, Boca Raton, FL (US); Slobodan Sipcic, Bethesda, MD (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 14/271,568

(22) Filed: May 7, 2014

(65) Prior Publication Data

US 2015/0326719 A1  Nov. 12, 2015

(51) Int. Cl.
*H04M 3/42* (2006.01)
*H04W 4/16* (2009.01)
*H04M 3/493* (2006.01)
*H04M 7/00* (2006.01)

(52) U.S. Cl.
CPC ...... *H04M 3/42348* (2013.01); *H04M 3/42059* (2013.01); *H04M 3/493* (2013.01); *H04M 7/0033* (2013.01); *H04W 4/16* (2013.01)

(58) Field of Classification Search
CPC .... H04L 29/0607; H04M 7/006; H04M 3/00; H04M 3/42; H04M 3/42348; H04M 3/42357; H04M 3/493; H04M 7/00; G06F 17/00; H04W 4/16; H04W 24/00
See application file for complete search history.

(56) References Cited

U.S. PATENT DOCUMENTS

| 8,301,169 | B2 * | 10/2012 | Hung | G06Q 10/109 455/404.2 |
| 8,577,393 | B2 | 11/2013 | Hung et al. | |
| 2006/0206504 | A1 * | 9/2006 | Cai | H04M 7/121 |

FOREIGN PATENT DOCUMENTS

WO    2013014019 A1    1/2013

OTHER PUBLICATIONS

Bormann et al., "Providing Intergrated Service over Low-bitrate Links," IP.com Prior Art Database Technical Disclosure No. IPCOM000003281D, Sep. 13, 2000, 12 pages.
Morneault et al., "Integrated Services Digital Network (ISDN) Q.921-User Adaptation Layer," IP.com Prior Art Database Technical Disclosure No. IPCOM000132723D, Jan. 6, 2006, 75 pages.

\* cited by examiner

*Primary Examiner* — Andrew Lai
*Assistant Examiner* — Leon Andrews
(74) *Attorney, Agent, or Firm* — Yee & Associates, P.C.; Steven Chiu (57) ABSTRACT

Inserting time zone information within an Integrated Services for Digital Network (ISDN) message header is provided. A time zone indicator corresponding to an origin of a communication is inserted into a time zone indicator field within a header of an ISDN message. The ISDN message with the inserted time zone indicator corresponding to the origin of the communication within the header is sent to another data processing system via a network.

13 Claims, 5 Drawing Sheets

USING AN ISDN MESSAGE HEADER TO SUPPORT TIME ZONE IDENTIFICATION

BACKGROUND

1. Field

The disclosure relates generally to telecommunications and more specifically to using an Integrated Services for Digital Network (ISDN) message header to support time zone identification prior to and during voice telecommunication.

2. Description of the Related Art

Innovations in telecommunications technologies have made a wide range of enhanced telecommunications services available to users. For example, a user may dial a telephone number at the press of a key using speed-dialing, retrieve a telephone number for a missed call, send or retrieve voice messages, and view a name and telephone number of a caller on a display of a mobile or landline telephone using caller identification (ID). A telecommunications provider often provides these services through a network, such as an intelligent services network (ISN), which is privately owned, but works in conjunction with a public switched telephone network (PSTN).

SUMMARY

According to one illustrative embodiment, a method for inserting time zone information within an Integrated Services for Digital Network (ISDN) message header is provided. A data processing system inserts a time zone indicator corresponding to an origin of a communication into a time zone indicator field within a header of an ISDN message. The data processing system sends the ISDN message with the inserted time zone indicator corresponding to the origin of the communication within the header to another data processing system via a network. According to other illustrative embodiments, a data processing system, and a computer program product for inserting time zone information within an ISDN message header are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
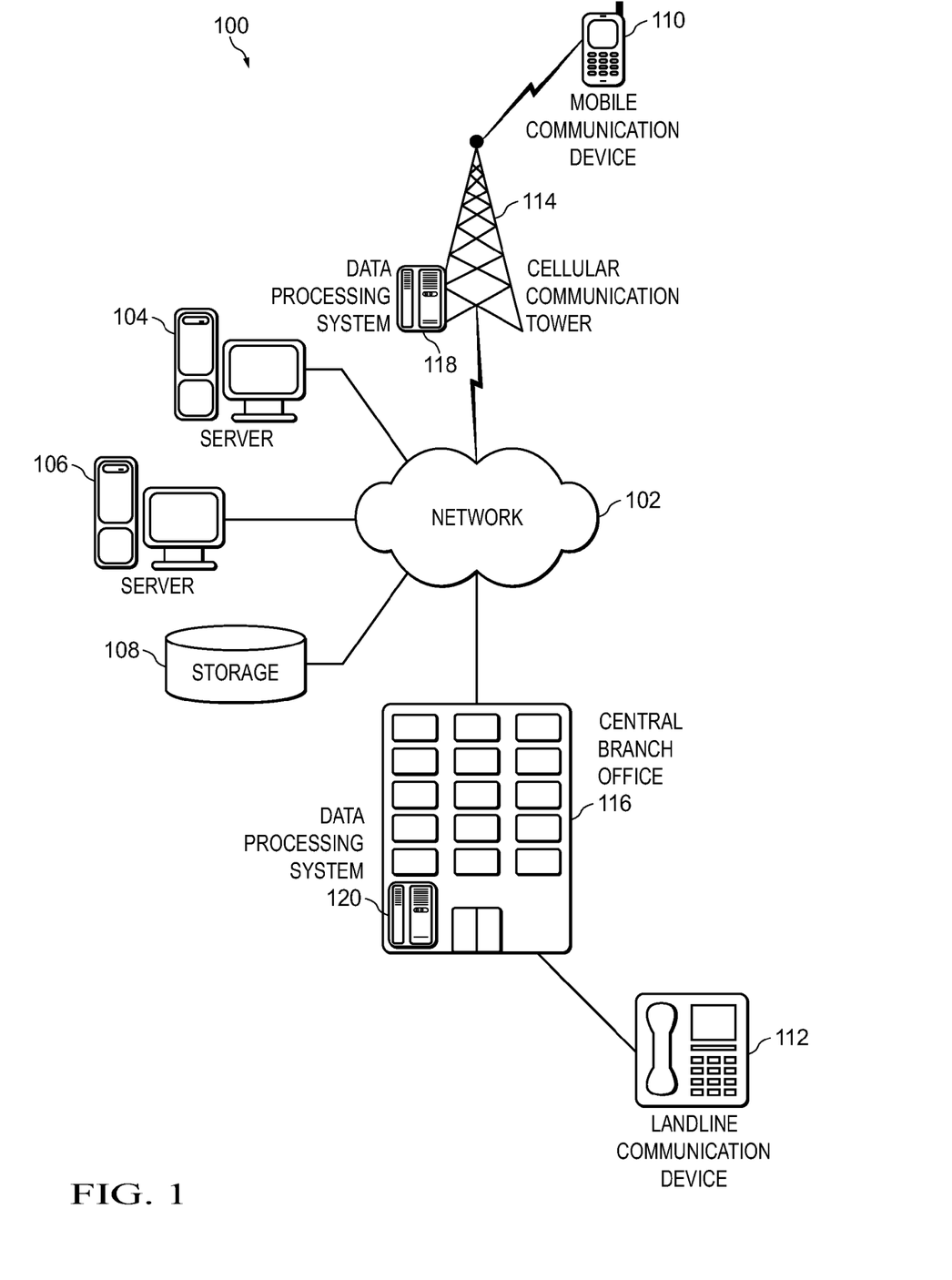
FIG. 1 is a pictorial representation of a network of data processing systems in which illustrative embodiments may be implemented.
Figure 2:
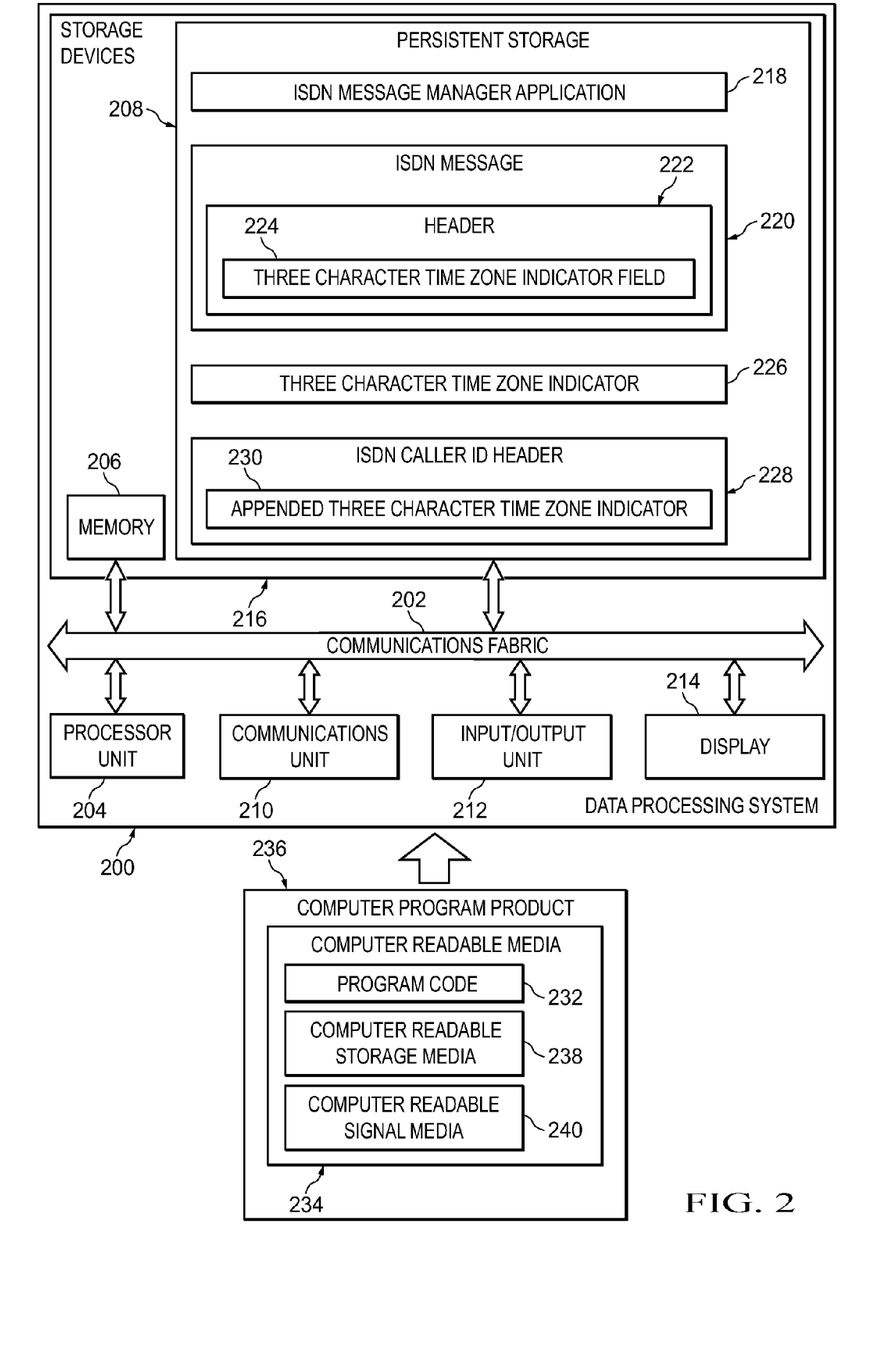
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile communication devices, landline communication devices, cellular communication towers, central branch offices, and other data processing devices in which the illustrative embodiments may be implemented. Network data processing system 100 contains network 102, which is the medium used to provide communications links between the computers, mobile communication devices, landline communication devices, cellular communication towers, central branch offices, and the other data processing devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more telecommunication system services to the client devices connected to network 102.

Mobile communication device 110 and landline communication device 112 also connect to network 102 via cellular communication tower 114 and central branch office 116, respectively. It should be noted that mobile communication device 110, landline communication device 112, cellular communication tower 114, and central branch office 116 represent a plurality of mobile communication devices, landline communication devices, cellular communication towers, and central branch offices connected to network 102. Mobile communication device 110 and landline communication device 112 are clients of server 104 and server 106. In the depicted example, server 104 and server 106 may provide information, such as boot files, operating system images, and applications to mobile communication device 110 and landline communication device 112. Users of mobile communication device 110 and landline communication device 112 utilize mobile communication device 110 and landline communication device 112 to access and use the telecommunication services provided by server 104 and server 106.

Mobile communication device 110 may be, for example, a smart phone, a cellular telephone, a handheld computer, a personal digital assistant, or a gaming device with wireless communication links to network 102. Landline communication device 112 may be, for example, a standard handset telephone, a cordless handset telephone, or a desktop computer. It should be noted that mobile communication device 110 and landline communication device 112 may represent any combination of different mobile communication devices and landline communication devices connected to network 102.

Cellular communication tower 114 wirelessly connects to network 102. Cellular communication tower 114 is a fixed-location transceiver that wirelessly communicates directly with mobile communication device 110. Cellular communication tower 114 serves a cell within the telecommunication system. Typically, a mobile communication device connects with the nearest available cellular communication tower. A mobile communication device makes and receives calls through the cellular communication tower that the mobile communication device is currently connected to within a cell. A mobile communication device is able to move from cell to cell during an ongoing continuous communication by one cellular communication tower in one cell handing off or handing over the mobile communication device to another cellular communication tower in another cell.

Central branch office 116 connects to network 102 using wire connections. Central branch office 116 is a fixed-location telephone exchange or central office telephone switch used to connect and route telephone calls in a public switched telephone network (PSTN). Multiple telephone switches capable of handling hundreds of thousands of telephone calls per hour may be housed within central branch office 116.

Landline communication device 112 connects to central branch office 116 via wire connections.

Cellular communication tower 114 and central branch office 116 include data processing system 118 and data processing system 120, respectively. Data processing systems 118 and 120 each represent a set of one or more data processing systems. Data processing systems 118 and 120 provide the computing and data processing capabilities of cellular communication tower 114 and central branch office 116, respectively. In addition, data processing systems 118 and 120 manage and control the insertion of time zone information within headers of ISDN messages, such as, for example, call setup messages, call acknowledgement or call connect messages, and call reject messages, corresponding to voice telecommunications within network 102.

Storage 108 is a network storage device capable of storing data in a structured format or unstructured format. Storage 108 may provide storage of a plurality of different user names and associated identification numbers, user profiles, and user account information associated with the telecommunication system. Further, storage unit 108 may store other data, such as authentication or credential data that may include user names, passwords, and biometric data associated with each of the plurality of users or system administrators. It should be noted that storage unit 108 may include any data that may be utilized by the telecommunication system.

Also, it should be noted that network data processing system 100 may include any number of additional server devices, mobile communication devices, landline communication devices, cellular communication towers, central branch offices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to data processing system 118 via network 102 for use on data processing system 118.

In the depicted example, network data processing system 100 may be implemented as a number of different types of telecommunication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or data processing system 118 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores ISDN message manager application 218. However, it should be noted that persistent storage 208 may store any type of application, program, module, and data utilized by the different illustrative embodiments. ISDN message manager application 218 is a software application that manages and controls the insertion of time zone information within headers of ISDN messages, such as ISDN message 220. ISDN message 220 may be, for example, a call setup message, call acknowledgement or call connect message, or a call reject message that corresponds to a voice telecommunication within a telecommunications network.

ISDN message 220 includes header 222. Header 222 includes routing information and other specific information associated with ISDN message 220. In this example, ISDN message manager application 218 inserts three character time zone indicator field 224 within header 222 after data processing system 200 receives ISDN message 220. Three character time zone indicator field 224 is a special field within header 222 that contains time zone information, such as three character time zone indicator 226. ISDN message manager application 218 inserts three character time zone indicator 226 into three character time zone indicator field 224.

Three character time zone indicator 226 indicates or identifies a particular time zone corresponding to a location of data processing system 200. Three character time zone indicator 226 may be, for example, EST, EDT, CST, CDT, MST, MDT, PST, or PDT. It should be noted that in an alternative embodiment, ISDN message manager application 218 may insert three character time zone indicator 226 into an already existing field within header 222 instead of inserting three character time zone indicator field 224 to specifically store three character time zone indicator 226.

Further, ISDN message manager application 218 appends three character time zone indicator 226 to ISDN caller ID header 228 prior to completing a connection with a receiving communication device, such as mobile communication device 110 or landline communication device 112 in FIG. 1. After receiving ISDN caller ID header 228 with appended three character time zone indicator 230, the receiving communication device extracts the caller ID information and time zone information from the header and displays the caller ID and time zone information on a display of the receiving device. Alternatively, the receiving communication device may announce the caller ID and time zone information via a speaker using a speech synthesizer.

Communications unit 210, in this example, provides for communication with mobile communication devices, landline communication devices, computing devices, and other data processing systems. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 232 is located in a functional form on computer readable media 234 that is selectively removable and may be loaded onto or transferred to data processing system 200 for running by processor unit 204. Program code 232 and computer readable media 234 form computer program product 236. In one example, computer readable media 234 may be computer readable storage media 238 or computer readable signal media 240. Computer readable storage media 238 may include, for example, an optical or magnetic disc that is inserted or placed into a drive or other device that is part of persistent storage 208 for transfer onto a storage device, such as a hard drive, that is part of persistent storage 208. Computer readable storage media 238 also may take the form of a persistent storage, such as a hard drive, a thumb drive, or a flash memory that is connected to data processing system 200. In some instances, computer readable storage media 238 may not be removable from data processing system 200.

Alternatively, program code 232 may be transferred to data processing system 200 using computer readable signal media 240. Computer readable signal media 240 may be, for example, a propagated data signal containing program code 232. For example, computer readable signal media 240 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 232 may be downloaded over a network to persistent storage 208 from another device or data processing system through computer readable signal media 240 for use within data processing system 200. For instance, program code stored in a computer readable storage media in a data processing system may be downloaded over a network from the data processing system to data processing system 200. The data processing system providing program code 232 may be a server computer, a client computer, or some other device capable of storing and transmitting program code 232.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 238 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more other devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that caller ID only tells who is calling, but does not tell from where and which time zone the caller is calling from. Though exact location information of a caller typically is not needed, time zone information may aid a telecommunication. For example, during a teleconference, a teleconferencing system may use time zone information to track the various time zones associated with different participants to take into consideration time differences between the different participants. As another example, an interactive voice response (IVR) system may use time zone information to adjust call flow and greet a customer based on the customer calling from a particular time zone.

Existing solutions use GPS data for exact location information and then map the GPS data to a corresponding time zone. However, this GPS solution is limited to mobile telephone to mobile telephone communication, which may often only be provided within the same telecommunication service provider network. As a result, this GPS solution leaves IVR systems, teleconference systems, and land line telephones without location information and time zone information that corresponds to an origin of an incoming call.

Illustrative embodiments insert a three character time zone indicator field within a header of an ISDN message to provide the time zone information corresponding to the origin of an incoming call. For example, illustrative embodiments insert a three character time zone indicator, such as EST, EDT, CST, CDT, MST, MDT, PST, or PDT, into the three character time zone indicator field to provide the time zone information. However, it should be noted that alternative illustrative embodiments may utilize a field that already exists within an ISDN message header to store the time zone indicator. In addition, illustrative embodiments are not limited to utilizing a three character time zone indicator. For example, alternative illustrative embodiments may use other time zone indicators, such as Eastern Standard Time, Central Standard Time, Mountain Standard Time, Pacific Standard Time, et cetera.

ISDN messages from both mobile communication devices and landline communication devices will include this three character time zone indicator field. As a result, the called or receiving communication device, which may be either a mobile or landline communication device, or a called IVR system, will receive the time zone information, along with caller ID information, within ISDN header fields. The called communication device may either display the time zone and caller ID information on a display of the called communication device, announce the time zone and caller ID information on a voice channel, or use the time zone and caller ID information silently. Consequently, illustrative embodiments are capable of communicating time zone information to all kinds of mobile communication devices, landline communication devices, IVR systems, as well as to different networks.

In the case of originating a voice communication from a mobile communication device, the first cellular communication tower, which originally receives the radio signal from the mobile communication device to place the call, inserts the three character time zone indicator into the three character time zone indicator field within the header of the ISDN call setup message before relaying the ISDN call setup message to the next cellular communication tower. In the case of originating a voice communication from a landline communication device, the central branch office, which picks up the signal from the landline communication device to place the call, inserts the three character time zone indicator into the three character time zone indicator field within the header of the ISDN call setup message before relaying the ISDN call setup message to the PSTN network.

On the receiving communication device side, illustrative embodiments utilize similar steps to insert the time zone information within the time zone field of an ISDN call acknowledge message header. Thus, the calling party's communication device, either mobile or landline, can identify a called party's time zone information, as well. Even on an ISDN call reject message when, for example, a line is busy or not answering, illustrative embodiments can insert the time zone information corresponding to the called party within a time zone field of an ISDN call reject message header to send back to the calling party's communication device.

After receiving the time zone information within an ISDN message header, the receiving communication device, either mobile or landline, may select to display the time zone information on a display, announce the time zone information via a speaker, or use the time zone information silently. By inserting the time zone information within an ISDN header at the layer three network level of the Open Systems Interconnection (OSI) Model, illustrative embodiments allow the upper four layers of the OSI model to utilize the time zone information as well.

Further, by using the ISDN message headers to carry the time zone information, illustrative embodiments do not need to utilize GPS-based location services. Consequently, illustrative embodiments work when location services on mobile communication devices are not enabled or are not available. For the same reason, illustrative embodiments are able to detect time zone information of calling and called mobile communication devices that do not have data plans available. Thus, illustrative embodiments of the present invention provide a method, data processing system, and computer program product for using ISDN message headers to support time zone identification prior to and during voice telecommunication.

Figure 3:
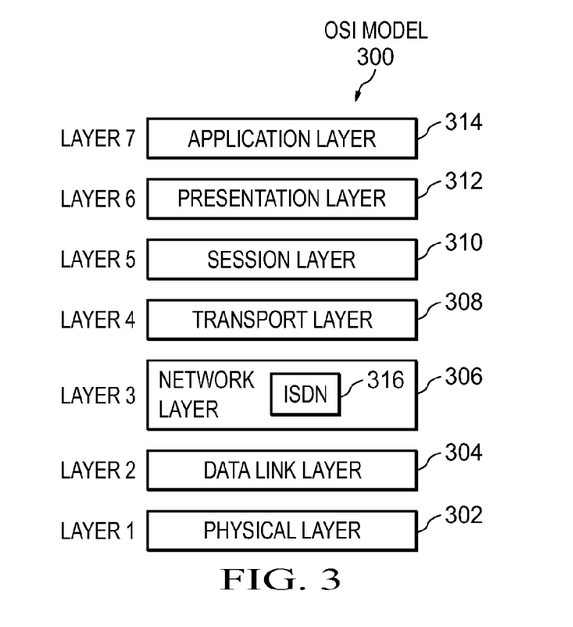
FIG. 3 is a diagram illustrating ISDN within an OSI model in accordance with an illustrative embodiment.

With reference now to FIG. 3, a diagram illustrating ISDN within an OSI model is depicted in accordance with an illustrative embodiment. OSI model 300 may be implemented in a network of data processing systems, such as, for example, network data processing system 100 in FIG. 1. OSI model 300 is a conceptual model that characterizes and standardizes internal functions of a telecommunications system by partitioning the model into abstraction layers.

OSI model 300 groups telecommunication functions into seven logical layers, layer one through layer seven with layer one at the bottom of the model. For example, physical layer 302 is layer one, data link layer 304 is layer two, network layer 306 is layer three, transport layer 308 is layer four, session layer 310 is layer five, presentation layer 312 is layer six, and application layer 314 is layer seven. In OSI model 300, each layer serves a layer above it and is served by the layer below it. For example, network layer 306 serves transport layer 308 and is served by data link layer 304.

Network layer 306 provides the functional and procedural means to transfer messages from one device to another device connected to the same network, such as network 102 in FIG. 1. Network layer 306 includes ISDN 316. ISDN 316 is a set of telecommunication standards for simultaneous digital transmission of voice, video, data, and other telecommunication system services over circuits of a public switched telephone network (PSTN). Although ISDN 316 services a public switched telephone network, ISDN 316 also provides services to packet switched networks, telex networks, cable television (CATV) networks, and the like.

Figure 4:
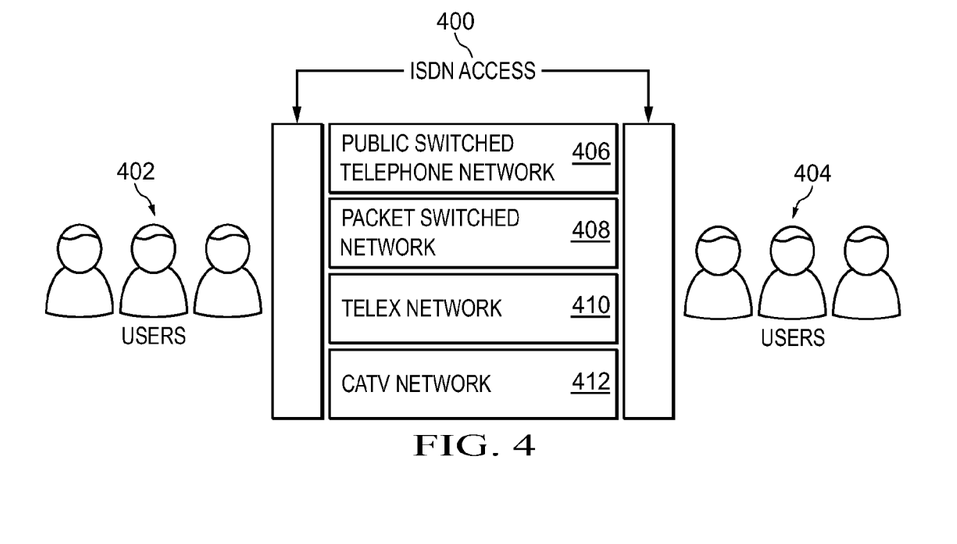
FIG. 4 is a diagram illustrating ISDN access in accordance with an illustrative embodiment.

With reference now to FIG. 4, a diagram illustrating ISDN access is depicted in accordance with an illustrative embodiment. ISDN access 400 may be implemented in a network layer of an OSI model, such as, for example, ISDN 316 in network layer 306 of OSI model 300 in FIG. 3. ISDN access 400 is an example of how users 402 can communicate with users 404 via one or more networks, such as public switched telephone network 406, packet switched network 408, telex network 410, and CATV network 412.

Users 402 and 404 utilize mobile or landline communication devices, such as mobile communication device 110 or landline communication device 112 in FIG. 1, to place and receive telecommunications. ISDN access 400 utilizes ISDN messages, such as ISDN message 220 in FIG. 2, to setup and teardown connections for the telecommunications between users 402 and 404 via one or more of public switched telephone network 406, packet switched network 408, telex network 410, and CATV network 412.

Figure 5A:
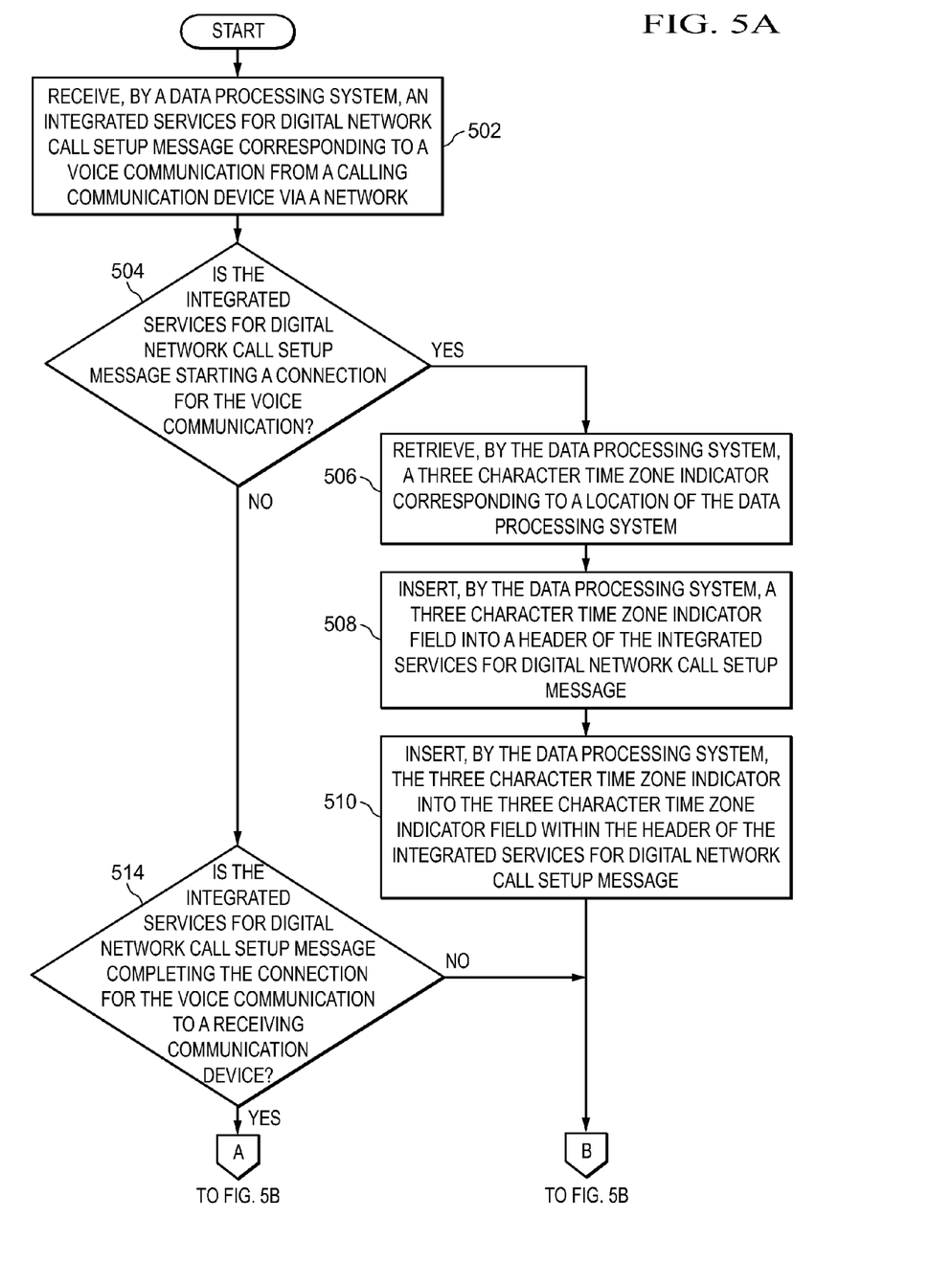
FIGS. 5A-5B are a flowchart illustrating a process for inserting time zone information into an ISDN call set up message header in accordance with an illustrative embodiment.
Figure 5B:
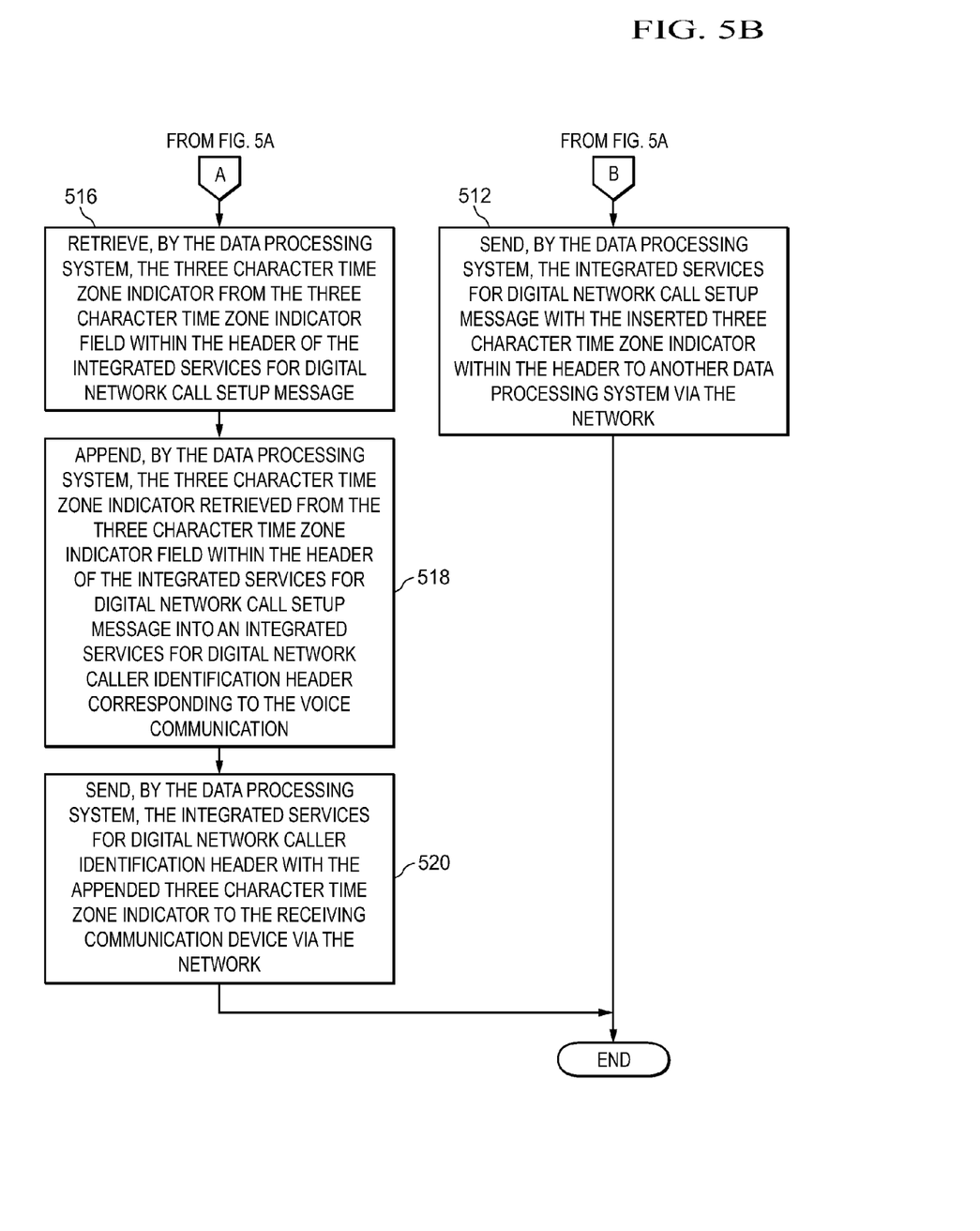

With reference now to FIGS. 5A-5B, a flowchart illustrating a process for inserting time zone information into an integrated services for digital network (ISDN) call set up message header is shown in accordance with an illustrative embodiment. The process shown in FIGS. 5A-5B may be implemented in a data processing system, such as, for example, data processing system 118 in FIG. 1 and data processing system 200 in FIG. 2.

The process begins when the data processing system receives an integrated services for digital network call setup message corresponding to a voice communication from a calling communication device via a network (step 502). The integrated services for digital network call setup message may be, for example, ISDN message 220 in FIG. 2. The calling communication device may be, for example, mobile communication device 110 in FIG. 1. The network may be, for example, network 102 in FIG. 1.

After receiving the integrated services for digital network call setup message in step 502, the data processing system makes a determination as to whether the integrated services for digital network call setup message is starting a connection for the voice communication (step 504). If the data processing system determines that the integrated services for digital network call setup message is starting the connection for the voice communication, yes output of step 504, then the data processing system retrieves a three character time zone indicator, such as three character time zone indicator 226 in FIG. 2, corresponding to a location of the data processing system (step 506). The three character time zone indicator may be, for example, EST, EDT, CST, CDT, MST, MDT, PST, or PDT that indicates or identifies a particular time zone corresponding to the location of the data processing system.

In addition, the data processing system inserts a three character time zone indicator field into a header, such as three character time zone indicator field 224 in header 222 in FIG. 2, of the integrated services for digital network call setup message (step 508). Further, the data processing system inserts the three character time zone indicator into the three character time zone indicator field within the header of the integrated services for digital network call setup message (step 510). Subsequently, the data processing system sends the integrated services for digital network call setup message with the inserted three character time zone indicator within the header to another data processing system, such as data processing system 120 in FIG. 1, via the network (step 512). Thereafter, the process terminates.

Returning again to step 504, if the data processing system determines that the integrated services for digital network call setup message is not starting the connection for the voice communication, no output of step 504, then the data processing system makes a determination as to whether the integrated services for digital network call setup message is completing the connection for the voice communication to a receiving communication device (step 514). The receiving communication device may be, for example, landline communication device 112 in FIG. 1. If the data processing system determines that the integrated services for digital network call setup message is not completing the connection for the voice communication to the receiving communication device, no output of step 514, then the process returns to step 512 where the data processing system sends the integrated services for digital network call setup message with the inserted three character time zone indicator within the header to another data processing system via the network.

If the data processing system determines that the integrated services for digital network call setup message is completing the connection for the voice communication to the receiving communication device, yes output of step 514, then the data processing system retrieves the three character time zone indicator from the three character time zone indicator field within the header of the integrated services for digital network call setup message (step 516). Furthermore, the data processing system appends the three character time zone indicator retrieved from the three character time zone indicator field within the header of the integrated services for digital network call setup message into an integrated services for digital network caller identification header corresponding to the voice communication (step 518). Afterward, the data processing system sends the integrated services for digital network caller identification header with the appended three character time zone indicator, such as ISDN caller ID header 228 with appended three character time zone indicator 230 in FIG. 2, to the receiving communication device via the network (step 520). Thereafter, the process terminates.

Thus, illustrative embodiments of the present invention provide a method, data processing system, and computer program product for using ISDN message headers to support time zone identification prior to and during voice telecommunication. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for inserting time zone information within an Integrated Services for Digital Network (ISDN) message header, the method comprising:

receiving, by a computer included in a cellular communication tower, an ISDN message having a time zone indicator corresponding to an origin of a communication within a header of the ISDN message;

responsive to the computer included in the cellular communication tower determining that the ISDN message is completing a connection for the communication, retrieving, by the computer included in the cellular communication tower, the time zone indicator from the header of the ISDN message;

appending, by the computer included in the cellular communication tower, the time zone indicator retrieved from the header of the ISDN message to an ISDN caller identification (ID) header corresponding to the communication; and sending, by the computer included in the cellular communication tower, the ISDN caller ID header with the appended time zone indicator corresponding to the origin of the communication to a receiving communication device via a network.

2. The method of claim 1, further comprising:

responsive to the computer included in the cellular communication tower determining that the ISDN message is starting a connection for the communication, inserting, by the computer included in the cellular communication tower, a time zone indicator field within the header of the ISDN message.

3. The method of claim 1, wherein the time zone indicator is a three character time zone indicator, and wherein the three character time zone indicator is one of EST, EDT, CST, CDT, MST, MDT, PST, or PDT, and wherein the EST is an Eastern Standard Time indicator, the EDT is an Eastern Daylight Time indicator, the CST is a Central Standard Time indicator, the CDT is a Central Daylight Time indicator, the MST is a Mountain Standard Time indicator, the MDT is a Mountain Daylight Time indicator, the PST is a Pacific Standard Time indicator, and the PDT is a Pacific Daylight Time indicator.

4. The method of claim 1, wherein the communication is a voice telecommunication.

5. The method of claim 1, wherein the ISDN message is an ISDN call setup message.

6. The method of claim 1, wherein the receiving communication device is a teleconferencing system that tracks time zones associated with different participants taking into consideration time differences between the different participants based on the time zone indicator corresponding to the origin of the communication within the header of the ISDN message.

7. The method of claim 1, wherein the receiving communication device is an interactive voice response system that adjusts call flow and greets a customer based on the time zone indicator corresponding to the origin of the communication from the customer calling from a particular time zone.

8. A computer system included in a cellular communication tower for inserting time zone information within an Integrated Services for Digital Network (ISDN) message header, the computer system comprising:

a bus system;

a storage device connected to the bus system, wherein the storage device stores computer readable program code; and a processor connected to the bus system, wherein the processor executes the computer readable program code to receive an ISDN message having a time zone indicator corresponding to an origin of a communication within a header of the ISDN message; retrieve the time zone indicator from the header of the ISDN message in response to determining that the ISDN message is completing a connection for the communication; append the time zone indicator retrieved from the header of the ISDN message to an ISDN caller identification (ID) header corresponding to the communication; and send the ISDN caller ID header with the appended time zone indicator corresponding to the origin of the communication to a receiving communication device via a network.

9. The computer system included in the cellular communication tower of claim 8, wherein the processor further executes the computer readable program code to insert a time zone indicator field within the header of the ISDN message in response to determining that the ISDN message is starting a connection for the communication.

10. A computer program product comprising a computer readable storage medium having computer readable program code encoded thereon that is executable by a computer included in a cellular communication tower for inserting time zone information within an Integrated Services for Digital Network (ISDN) message header, the computer program product comprising:

computer readable program code to receive an ISDN message having a time zone indicator corresponding to an origin of a communication within a header of the ISDN message;

computer readable program code to retrieve the time zone indicator from the header of the ISDN message in response to determining that the ISDN message is completing a connection for the communication;

computer readable program code to append the time zone indicator retrieved from the header of the ISDN message to an ISDN caller identification (ID) header corresponding to the communication; and computer readable program code to send the ISDN caller ID header with the appended time zone indicator corresponding to the origin of the communication to a receiving communication device via a network.

11. The computer program product of claim 10, further comprising:

computer readable program code to insert a time zone indicator field within the header of the ISDN message in response to determining that the ISDN message is starting a connection for the communication.

12. The computer program product of claim 10, wherein the time zone indicator is a three character time zone indicator, and wherein the three character time zone indicator is one of EST, EDT, CST, CDT, MST, MDT, PST, or PDT, and wherein the EST is an Eastern Standard Time indicator, the EDT is an Eastern Daylight Time indicator, the CST is a Central Standard Time indicator, the CDT is a Central Daylight Time indicator, the MST is a Mountain Standard Time indicator, the MDT is a Mountain Daylight Time indicator, the PST is a Pacific Standard Time indicator, and the PDT is a Pacific Daylight Time indicator.

13. The computer program product of claim 10, wherein the communication is a voice telecommunication.

* * * * *